July 11, 1961

J. GUTKOWSKI 2,991,885

OIL FILTER UNIT

Filed July 15, 1957

*Inventor*
JANUSZ GUTKOWSKI by: J. Richard Cavanagh
Patent Agent

July 11, 1961 J. GUTKOWSKI 2,991,885
OIL FILTER UNIT
Filed July 15, 1957 3 Sheets-Sheet 2
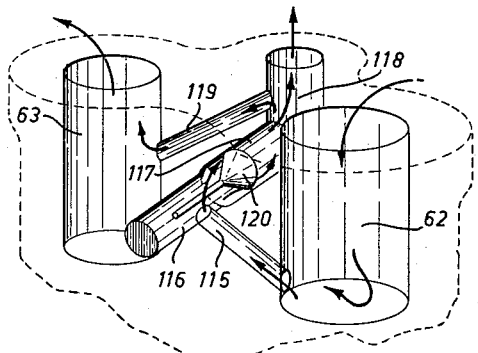
FIG. 5
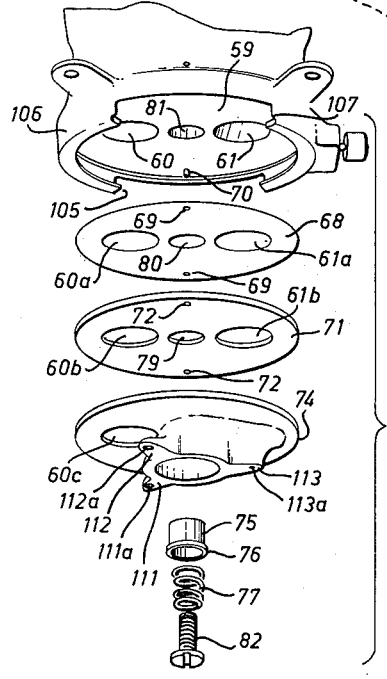
FIG. 6
FIG. 7
FIG. 8
Inventor
JANUSZ GUTKOWSKI
by: J. Richard Cavanagh
Patent Agent July 11, 1961
J. GUTKOWSKI
2,991,885
OIL FILTER UNIT
Filed July 15, 1957
3 Sheets-Sheet 3
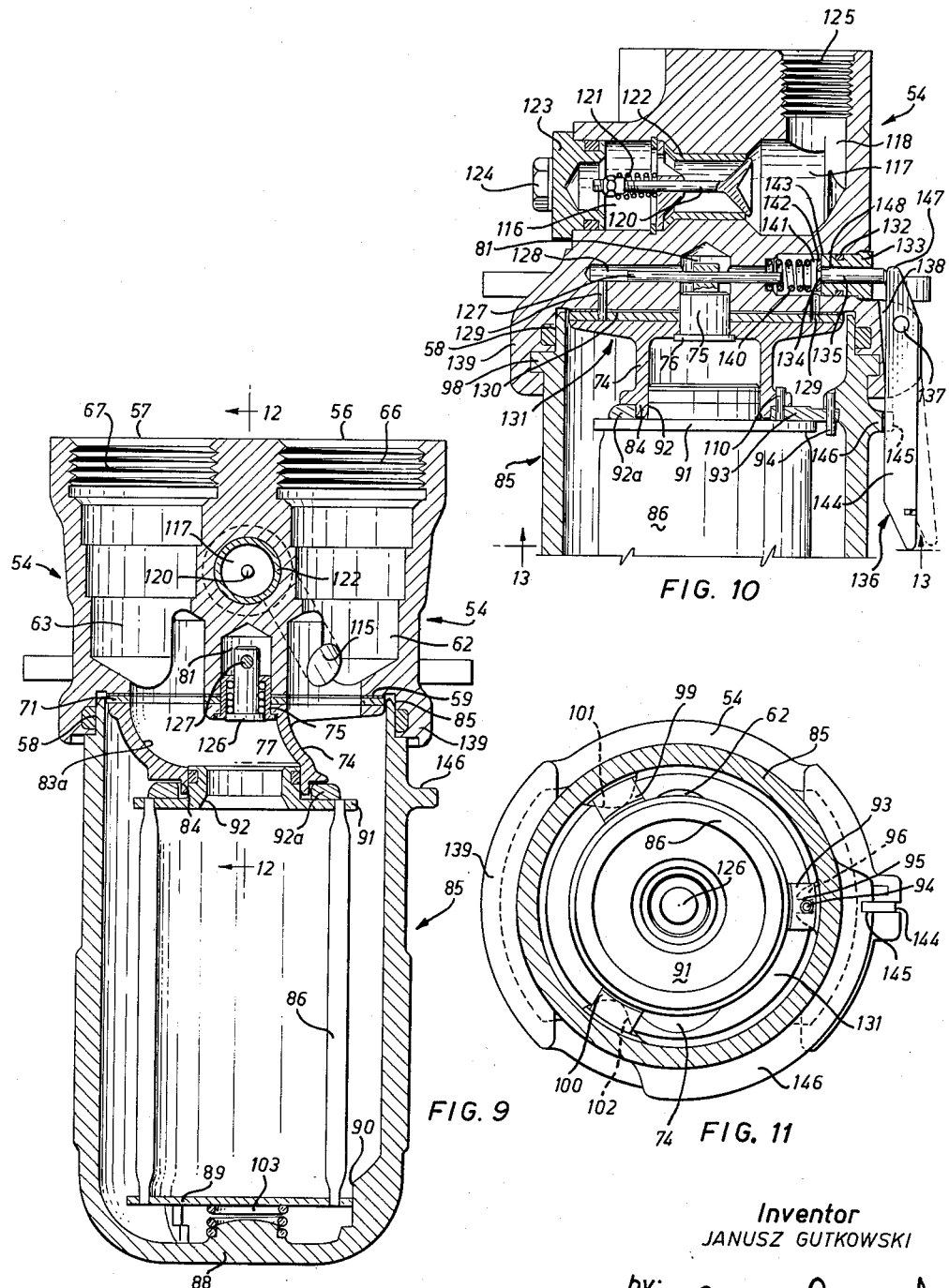
Inventor
JANUSZ GUTKOWSKI
by: J. Richard Cavanagh
Patent Agent United States Patent Office 2,991,885
Patented July 11, 1961

2,991,885
OIL FILTER UNIT
Janusz Gutkowski, Owen Sound, Ontario, Canada, assignor, by mesne assignments, to New York Business Development Corporation, Albany, N.Y., a corporation of New York
Filed July 15, 1957, Ser. No. 671,975
5 Claims. (Cl. 210—133)

This invention relates to an oil filter particularly adapted for aircraft use and characterized by rotary valve structure enabling the bowl of the filter to be removed from the head in such manner that both the inlet and outlet ports to the filter are closed by rotating the bowl to enable removal of the latter.

Prior oil filter constructions having a head part and a removable bowl and particularly those constructions utilized in aircraft service, are of such design that separate operations are required to cut off oil flow therethrough before removal of the filter bowl. As a result, waste or overflow of hydraulic fluid or lubricating oil is often experienced in conjunction with removal of the filter bowl to rejuvenate or renew the filter element therein. In addition, any interruption of an hydraulic line gives rise to the disadvantage of the introduction of air or foreign matter into the hydraulic system.

It is the main object of the present invention to provide an oil filter having a head and a removable bowl structure in which co-operating rotary valve elements are provided in a form adapted to be actuated by the bowl during insertion or removal of the latter from the head whereby to ensure severance of fluid flow through the filter bowl before removal of the latter.

It is another object of the invention to provide an oil filter substantially as described hereinafter in which disc or equivalent rotary valve structure is actuated during removal of the bowl from the head in such manner that inlet and outlet ports in communication with the bowl are closed before the fluid seal between the bowl and the head is opened.

It is another object of the invention to provide an oil filter having cut-off valve structure for inlet and outlet ports communicating to the bowl including means compensating for wear of the valve structure.

It is a further object of the invention to provide an oil filter having cut-off valve structure for inlet and outlet ports of a removable filter bowl in which metal-to-metal seals are employed in the valve structure and filter bowl head assembly when assembled to permit a wide range of temperature operations.

It is a still further object of the invention to provide an oil filter having a removable bowl in which cut-off valve structure for the inlet and outlet ports of the bowl is automatically actuated upon removal of the filter bowl and head permitting one location assembly thereof, that is, permitting the bowl and filter assembly to be assembled with the head in only one way whereby to avoid erroneous replacement and assembly.

It is a still further object of the invention to provide an oil filter having an air bleed off valve embodied therein.

Other objects of the invention will be appreciated by a study of the following specification taken in conjunction with the accompanying drawings.

In the drawings:

FIGURE 5 is a fluid flow passage diagram for the head structure of the filter unit of FIGURE 1 being in perspective corresponding to the perspective of FIGURE 1;

FIGURE 6 is an underside perspective exploded view of disc valve structure for the filter head of the filter of FIGURE 1;

FIGURE 7 is an underside exploded perspective view of filter bowl components of the filter of FIGURE 1 illustrating the same in relation to the exposed valve structure of the filter head upon removal therefrom;

FIGURE 8 is a plan view on the line 10—10 of FIGURE 7 but illustrating the filter components in assembly;

FIGURE 9 is a sectional elevation of a further modified form of filter unit structure according to the invention in respect to disc valve assembly detail and filter bowl assembly locking means;

FIGURE 10 is a sectional view on the line 12—12 of FIGURE 9;

FIGURE 11 is a sectional view on the line 13—13 of FIGURE 10.

Figure 3:
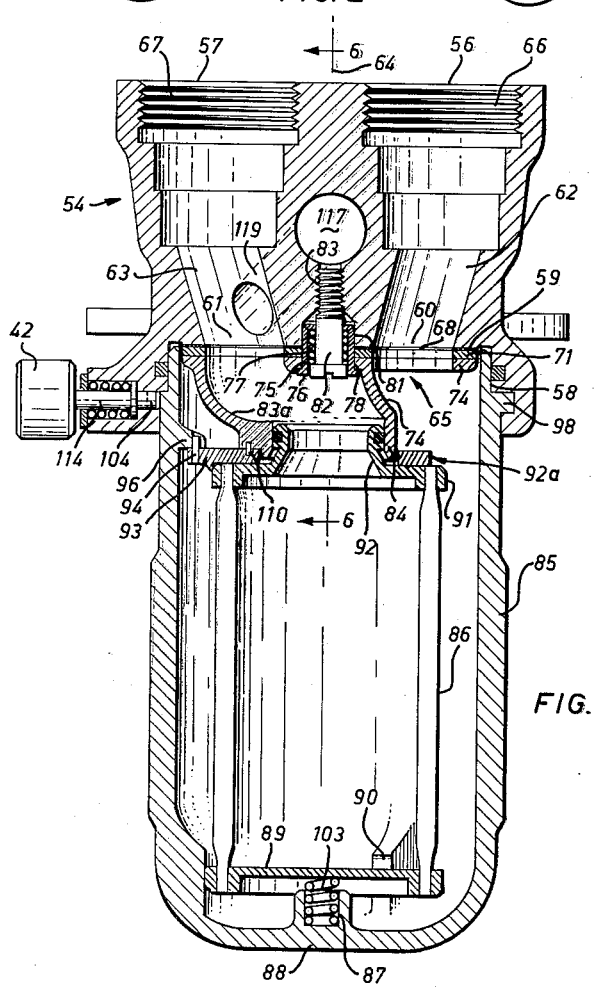
FIGURE 3 is a sectional elevation of the filter of FIGURE 1 on the line 5—5 of FIGURE 2.

The filter unit of the invention is shown in FIGURES 1 to 8, and comprises the head 54 preferably of die cast light metal alloy construction, having inlet and outlet threaded fitting bores 56 and 57 respectively as shown in FIGURE 3. The filter head embodies a filter bowl socket 58 terminating in a disc valve face or seat 59 having therein diametrically opposed inlet and outlet ports 60 and 61 respectively communicating by bores 62 and 63 to the inlet and outlet fittings 66 and 67. The ports 60 and 61 are of equal diameter disposed at the same radial distance from the vertical central axis 64 of the filter unit. The disc valve assembly 65 is shown in an exploded view detail in FIGURE 6. The valve seat supporting surface 59 carries a compression gasket 68 having indexing apertures 69 therein adapted to locate on the locating pins 70 to prevent the gasket from rotating. A rotary disc member surface 71 is provided on the rotatable disc valve supporting member 74. Thus, as shown also in FIGURE 3 the assembly sleeve 75 having a clamping flange 76 and containing spring 77 is adapted to extend through the axial mounting holes 78 in the fitting 74 and corresponding mounting holes 79 and 80 of the disc member 71 and gasket 78 to slideably seat in the axial socket 81 of the head 54. Mounting screw 82 engages in the threaded co-axial bore 83 of the head beyond the socket 81 to thereby compress the spring 77 effecting assembly of the components shown in FIGURE 6 under the biasing force of this spring as determined by screw 82.

In operation, rotation of the disc valve fitting 74 over surfaces of the rotary disc member 71 is restrained from rotation by the restraining pins 70. The components of assembly illustrated in FIGURE 6 carry corresponding outlet and inlet apertures 60a, 60b, 60c and 61a, 61b 61c wherein fitting 74 embodies an inwardly directed conduit portion 83a providing an axially depending outlet socket 84 projecting into the filter bowl 85.

The manner of and mechanism for assembly of the filter element 86 into the filter bowl 85 is illustrated in FIGURES 3, 9 and 10. The filter bowl embodies a spring socket 87 in its base 88 whereby the filter supporting base 89 is biased outwardly within the inwardly projecting guide means 90 of the filter bowl. The upper filter support element 91 embodies a filter outlet fitting 92 adapted to seat in the valve fitting socket 84. The filter assembly including the filter element 86 and supports 89 and 91 is retained within the filter bowl by the retaining spider 92 having one indexing arm 93 carrying a locating pin 94 adapted to engage in a locating notch 95 of the filter retaining lug 96 extending inwardly within the filter bowl in alignment with an exterior locating notch 97 defined by the spaced apart exterior bayonet lugs 98 on the exterior of the bowl. The remaining spider arms 99 and 100 are adapted to seat under the retaining inward projections 101 and 102 respectively of the bowl.

In assembly the filter is placed into the filter bowl with the spider retaining member 92 seating thereon. The spider member is then in the position indicated by way of example in chain lines in FIGURE 8. While pressing the filter into the bowl against the pressure of spring 103 the spider member may be rotated to the position indicated in bold lines and released to cause the spider arms to upwardly engage the retaining lugs described. By reason of locating pin 94 carried by the spider arm 93 the spider member 92a may be assembled with the bowl in only one way.

One way assembly of the filter bowl is provided by including a third bayonet lug 104 diametrically opposed to the lugs 98 and 98a but of greater length, being adapted for accommodation in the larger bayonet lug opening 105 of the head bayonet flange 106 as opposed to the narrower opening 107 adapted to accommodate the bayonet lugs 98 and 98a. The spider member 92a of the assembled filter bowl carries three drive and inducing pins of which the pins 108 and 109 are of relatively large diameter as compared with the small diameter pin 110 aligned with locating pin 94. The valve member fitting 74 as indicated in FIGURES 4, 6 and 7 carries locating members 111, 112 and 113 thereon, having pin sockets 111a, 112a and 113a adapted to accommodate respectively the pins 108, 109 and 94.

During assembly of the filter bowl to the filter head the bayonet lug 104 is aligned with the socket 105, thereby permitting the bowl to seat within the bayonet socket 58, providing the valve element fitting 74 is rotated to a position of 90° counterclockwise out of registry with the valve head supporting surface 59 (see FIGURE 6). In this position of the components the driving studs or pins 108, 109 and 110 will automatically align and locate in their respective indexing sockets in the valve element fitting 74. If the pins do not so locate them the valve element fitting 74 must be out of alignment and must be rotated to permit such assembly. Upon proper alignment and assembly the filter bowl bayonet lugs seat in the filter bowl socket 58, and the filter outlet fitting 92 seats in the socket 84 of the valve member fitting 74. The filter bowl is then rotated clockwise in the description set forth to cause the locating notch 97 to align with the spring biased locking pin 114. In the event the filter bowl is rotated counterclockwise the locking pin will not seat and the operator will be aware of improper assembly. Regardless, rotation of the filter bowl to accomplish seating of the locking pin 114 will align the valve member assembly including the valve member 71 and valve member fitting 74 with the gasket 68 and filter head valve support surface 59.

Figure 1:
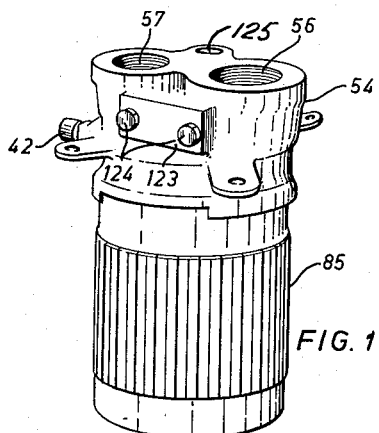
FIGURE 1 is a perspective view of an oil filter according to the invention embodying disc valve head structure.
Figure 2:
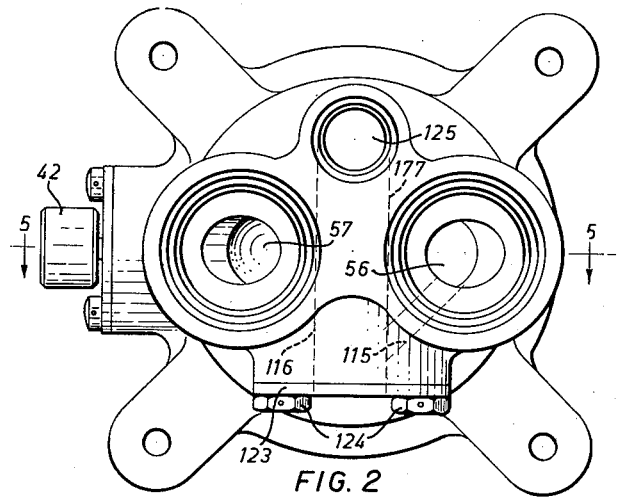
FIGURE 2 is a plan view of the filter of FIGURE 1.
Figure 4:
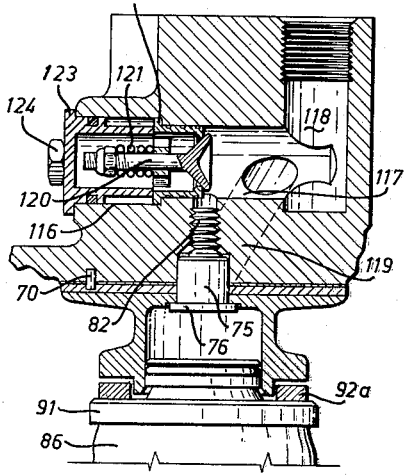
FIGURE 4 is a sectional view on the line 6—6 of FIGURE 3.

Relief valve structure for by-passing oil between inlet and outlet bores 56 and 57 may be incorporated in the filter head 54 in the manner indicated in FIGURES 4 and 5. For this purpose there are provided by-pass passages 115, 116, 117, 118 and 119 between the inlet and outlet passages 62 and 63 in the filter head. The geometric configuration of the passages is best illustrated in FIGURE 5. Passages 116 and 117 contain relief valve member 120 biased by spring means 121 and incorporating a valve seat structure 122 held in place by a covered fitting 123 fastened to the head by suitable bolts 124. The fitting 123 serves to close the passage 116, so that upon an excess of pressure building up in the inlet passage 62 communicates through passage 115 to release the valve member 120 from its valve seat 122 against the pressure biased spring 121, whereby the fluid flow makes direct circuit past the valve member and through passage 117 to supplementary outlet passage 118 to which a by-pass outlet line may be connected as at the threaded fitting outlet 125, if desired. By way of alternative, the supplementary outlet fitting 125 may be closed by a suitable threaded plug (not shown). In any case, passage 118 communicates by passage 119 with the outlet passage 63, whereby fluid flow remains uninterrupted in the event the filter becomes unduly clogged.

A further modified form of the invention is revealed in FIGURES 9 to 11 wherein the structure bears much similarity to the disclosure of FIGURES 1 to 8, but embodies modification in locking means provided for assembly of the filter bowl to the filter head. Accordingly, the description of these figures is substantially confined to the improvements involved where otherwise like numerals designate like components in the previous figures.

In this modification the disc valve components are held in assembly by a supporting member 126 acting in a similar manner to the screw 82 of FIGURE 3, but are retained within the head by means of a supporting rod 127 revealed in more detail in FIGURE 10 and resting in the enlarged bore 128. Bore 128 serving as an air bleeding passage during assembly of the filter communicates by bleed passages 129 with working surfaces 130 of the disc valve structure 131. Transverse bore 128 communicates with a large bore 132 carrying sealed fitting 133 in communication with the exterior of the head 54. Fitting 133 carries a poppet valve member 134 having a stem 135 extending exteriorly of the fitting for actuation by a locking lever 136 pivoted as at 137 in a vertical slot 138 and exerts spring pressure causing clockwise rotation of the latter under action of spring 140 in the bore 132. The head 141 of poppet valve 134 embodies a sealing member 142 seating against the inner surface 143 of fitting 133 when the locking arm 136 is pivoted to the full clockwise position indicated in FIGURE 10 at which the locking arm portion 144 thereof is freely within a locating or indexing slot 145 of an exterior radial rib 146 on the filter bowl.

Upon insertion of the filter bowl into the socket 85 of the filter head 54 air escapes by way of the air bleeding passages 129 and 134 to the bore 132. Since, however, the locking arm 144 will be deflected outwardly by the rib 146 until such time as the arm is aligned with the locating slot 145 for a correct positioning of all components, the upper end 147 of the locking arm 136 will release the poppet valve 134 against the biasing pressure of spring 140, thereby opening the valve and allowing air to bleed from the bore 132 through the bore 148 of fitting 133 loosely accommodating the stem 135 of the poppet valve. Upon rotation of the filter bowl to the correct position of alignment at which the locking arm 136 rotates clockwise under action of biasing spring 140 corresponding to a correct alignment of all components the poppet valve 134 seats on the fitting 133 preventing further escape of air or fluid from the bore 132. It will be observed that upon disassembly of the filter, manual release of the locking arm is required, causing the poppet valve to open and retaining the stem in the open position by reason of the angular extent of the rib 146 to the position at which the filter bowl is aligned for removal. By this means a pressure lock which may in some constructions of the invention prevent assembly and disassembly of the components is obviated.

In all of the constructions of the invention removal or assembly of the filter bowl actuates a rotary valve governing flow of fluid to the filter bowl. Both inlet and outlet ports are closed by the constructions disclosed. In the rotary valve structure of the invention compensation is made for wear by providing a biasing of the valve elements by separate spring means as illustrated. It will be observed that inadvertent replacement of the filter bowl without a contained filter unit will not enable the valve structure to be actuated, since in all cases valve structure actuation is operatively related to filter structure within the filter bowl. Moreover, placement of the filter in the bowl with the base of the filter element uppermost will not permit assembly of the filter bowl to the head enabling actuation of the valve structure. The rotary valve structure of the invention provides a configuration of valve elements conducive to desirable flow conditions within the filter unit in such disposition as to permit the freer availability for servicing and inspecting than is common in the art.

From the foregoing it will be appreciated that in a general sense the oil filter unit of the invention embodies a filter element having an outlet fitting and contained within a filter bowl having an open end in which the outlet fitting is concentrically located. The space between the outlet fitting and periphery of the open end of the bowl constitutes an inlet opening for the bowl. A filter head embodies a socket adapted to receive the filter bowl end for manual rotation of the latter therein and communication with the inlet opening of the bowl. Rotary valve structure is provided in the head which is rotatable upon manual rotation of the filter bowl in the socket to establish communication of fluid from an inlet fitting in the head to the bowl in that opening, and from the filter outlet fitting of the head at a predetermined rotary position of the filter bowl with respect to the head. The connection of the filter bowl to the head is such that removal of the bowl requires rotation of the latter to effect closure of the rotary valve before the filter bowl can be removed. Upon replacement of the bowl the latter is required to be rotated to effect rotation of the rotary valve structure thereby to the open position at which final assembly of bowl and filter head is released.

While specific forms of filter unit have been disclosed in order to illustrate the concept and elements of the invention it will be appreciated that various modifications may be designed and fabricated by skilled persons to provided a general structure embodying a by-pass valve remote from previously filtered dirt thereby to reduce to a minimum the amount of previously filtered dirt which is re-circulated back into the filtering system when the by-pass valve opens. The arrangement of head containing valve structure serving in shut off and relief valve function permits a fluid passage array and size of exceptionally low pressure drop. While a plate or disc type valve has been disclosed various rotary slide valve configurations may be employed of conical or spherical form. Such geometric configurations lend themselves well to the provision of an array of multiple inlets and outlets.

In view of the absence of synthetic seals the filter unit of the invention is particularly adapted for the filtering of a wide range of fluids.

It is intended that this disclosure should not be construed in any limiting sense other than that indicated by the scope of the following claims.

What I claim as my invention is:

1. An oil filter unit comprising in combination: a generally cylindrical filter element having an outlet fitting at one end thereof; a filter bowl having an open end and adapted to support said filter element therein to dispose the outlet fitting thereof concentric in said opening thereby defining an annular inlet opening for said bowl; a filter head including a filter bowl socket adapted to receive said filter bowl for manual rotation of the latter therein and communication with said annular inlet opening; inlet and outlet fittings for communicating fluid into and out of said head; rotary valve structure in said head rotatable therein upon rotation of said filter bowl in said socket and communicating fluid from said outlet fitting of said filter element to the outlet fitting of said head and simultaneously from the inlet fitting of said head to the inlet of said filter bowl at a predetermined rotary position of said filter bowl with respect to said head; a deflectable locking arm on said filter head; means on said filter bowl for deflecting said locking arm during rotation of said filter bowl in said head; air valve means in said filter head actuable upon deflection of said locking arm to establish communication of said valve structure with exterior atmosphere; and a slot in said deflecting means adapted to accept the latter for closure of said air valve means providing restraint against further rotation of said filter bowl and positioning the latter in said head thereby to render said rotary valve structure open.

2. An oil filter unit comprising in combination: a filter element having an outlet fitting; a filter bowl having an open end and adapted to support said filter element therein to dispose the outlet fitting thereof concentric in said opening thereby defining an annular inlet opening for said bowl; a filter head including a filter bowl socket adapted to receive said filter bowl for manual rotation of the latter therein and communication with said annular inlet opening; inlet and outlet fittings for communicating fluid into and out of said head; disc valve structure in said head having a valve axis co-axially within said filter bowl socket; a disc valve seat in said head including diametrically opposed inlet and outlet openings therein communicating respectively with said inlet and outlet fittings of said head; a disc valve fitting forming a part of said valve structure including a valve member having inlet and outlet openings registerable with the inlet and outlet openings of said disc valve seat; means suspending said disc valve fitting for rotary valve action about said axis with said seat, one of the openings of said disc valve fitting being in communication with said filter bowl socket; and means on said disc valve fitting engageable with the outlet fitting of said filter element providing communication of said outlet fitting solely to the other opening of said disc valve fitting.

3. An oil filter unit comprising in combination: a filter element having an outlet fitting; a filter bowl having an open end and adapted to support said filter element therein to dispose the outlet fitting thereof concentric in said opening thereby defining an annular inlet opening for said bowl; a filter head including a filter bowl socket adapted to receive said filter bowl for manual rotation of the latter therein and communication with said annular inlet opening; inlet and outlet fittings for communicating fluid into and out of said head; disc valve structure in said head having a valve axis co-axially within said filter bowl socket; a disc valve seat in said head including diametrically opposed inlet and outlet openings therein communicating respectively with said inlet and outlet fittings of said head; a disc valve fitting forming a part of said valve structure including a valve member having inlet and outlet openings registerable with the inlet and outlet openings of said disc valve seat; means suspending said disc valve fitting for rotary valve action about said axis with said seat, one of the openings of said disc valve fitting being in communication with said filter bowl socket; means on said disc valve fitting engageable with the outlet fitting of said filter element providing communication of said oulet fitting solely to the other opening of said disc valve fitting; means rotatable with said filter bowl and clamping said filter element therein; and indexing means determining single position engagement of said filter outlet fitting and the disc valve fitting engaging means therefor.

4. An oil filter unit comprising in combination: a filter element having an outlet fitting; a filter bowl having an open end and adapted to support said filter element therein to dispose the outlet fitting thereof concentric in said opening thereby defining an annular inlet opening for said bowl; a filter head including a filter bowl socket adapted to receive said filter bowl for manual rotation of the latter therein and communication with said annular inlet opening; inlet and outlet fittings for communicating fluid into and out of said head; disc valve structure in said head having a valve axis coaxially within said filter bowl socket; a disc valve seat in said head including diametrically opposed inlet and outlet openings therein communicating respectively with said inlet and outlet fittings of said head; a disc valve fitting forming a part of said valve structure including a valve member having inlet and outlet openings registerable with the inlet and outlet openings of said disc valve seat; means suspending said disc valve fitting for rotary valve action about said axis with said seat, one of the openings of said disc valve fitting being in communication with said filter bowl socket; means on said disc valve fitting engageable with the outlet fitting of said filter element providing communication of said outlet fitting solely to the other opening of said disc valve fitting; drive structure associated with said filter element and engageable with said disc valve fitting on assembly of said filter unit and communicating rotation of said filter bowl and filter element to said disc valve fitting; and bayonet locking structure on said filter bowl and said head including bayonet lugs retaining said bowl and head in assembly until said filter bowl is rotated through substantially 90° from a position at which said rotary valve structure is aligned in an open position within said head to provide severance of fluid flow to and from said filter before removal of said filter bowl from said head.

5. An oil filter unit comprising in combination: a filter element having an outlet fitting; a filter bowl having an open end and adapted to support said filter element therein to dispose the outlet fitting thereof concentric in said opening thereby defining an annular inlet opening for said bowl; a filter head including a filter bowl socket adapted to receive said filter bowl for manual rotation of the latter therein and communication with said annular inlet opening; inlet and outlet fittings for communicating fluid into and out of said head; disc valve structure in said head having a valve axis coaxially within said filter bowl socket; a disc valve seat in said head including diametrically opposed inlet and outlet openings therein communicating respectively with said inlet and outlet fittings of said head; a disc valve fitting forming a part of said valve structure including a valve member having inlet and outlet openings registerable with the inlet and outlet openings of said disc valve seat; means suspending said disc valve fitting for rotary valve action about said axis with said seat, one of the openings of said disc valve fitting being in communication with said filter bowl socket; means on said disc valve fitting engageable with the outlet fitting of said filter element providing communication of said outlet fitting solely to the other opening of said disc valve fitting; and pressure sensitive relief valve means in said valve structure permitting direct communication between said inlet and outlet fittings of said head while said valve structure is both in and out of alignment therewith.

References Cited in the file of this patent

UNITED STATES PATENTS

| 1,797,198 | Ingersoll | Mar. 17, 1931 |
| 2,075,459 | Parker | Mar. 30, 1937 |
| 2,431,782 | Walton | Dec. 2, 1947 |

FOREIGN PATENTS

| 71,755 | Austria | May 25, 1916 |
| 127,137 | Australia | Mar. 15, 1948 |
| 618,523 | Great Britain | Feb. 23, 1949 |